(12) United States Patent
Raby

(10) Patent No.: US 9,972,221 B2
(45) Date of Patent: May 15, 2018

(54) REPOSITIONABLE TAXIDERMY MOUNT APPARATUS

(76) Inventor: Samuel F. Raby, Bluffdale, UT (US)

( * ) Notice: Subject to any disclaimer, the term of this patent is extended or adjusted under 35 U.S.C. 154(b) by 1157 days.

(21) Appl. No.: 11/963,828

(22) Filed: Dec. 22, 2007

(65) Prior Publication Data
US 2011/0036959 A1    Feb. 17, 2011

(51) Int. Cl.
*G09B 23/36*    (2006.01)
*B44C 5/02*    (2006.01)

(52) U.S. Cl.
CPC ............... *G09B 23/36* (2013.01); *B44C 5/02* (2013.01)

(58) Field of Classification Search
CPC .................................. G09B 23/36; B44C 5/02
USPC .......... 248/282.1, 285.1, 289.11, 240, 240.4, 248/122.1, 125.7, 213.1; 428/542.4
See application file for complete search history.

(56) References Cited

U.S. PATENT DOCUMENTS

| | | | | |
|---|---|---|---|---|
| 1,682,180 A * | 8/1928 | Merrill | | 248/285.1 |
| 3,550,892 A * | 12/1970 | Propst | | 248/282.1 |
| 4,145,006 A | 2/1979 | Webb | | 269/69 |
| 4,225,106 A | 9/1980 | Eplan | | 248/309 R |
| 4,307,672 A * | 12/1981 | Shikimi | | 108/139 |
| 4,449,172 A * | 5/1984 | Warshawsky | | 362/427 |
| 4,464,440 A * | 8/1984 | Dotzman | | 428/542.4 |
| 4,561,339 A * | 12/1985 | Jensen | | 84/453 |
| 4,565,346 A * | 1/1986 | Edwards | | 248/558 |
| 4,971,865 A | 11/1990 | Nowlan | | 428/542.4 |
| 5,015,532 A * | 5/1991 | Knight | | 428/542.4 |
| 5,779,294 A * | 7/1998 | Magri | | 294/61 |
| 6,209,835 B1 * | 4/2001 | Walrath et al. | | 248/276.1 |
| 6,458,434 B1 * | 10/2002 | Coombs, Jr. | | 428/16 |
| 6,561,468 B2 | 5/2003 | Williamson | | 248/146 |
| 6,695,270 B1 * | 2/2004 | Smed | | 248/274.1 |
| 6,828,035 B1 | 12/2004 | Goettl | | 428/542.4 |
| D520,017 S * | 5/2006 | van Kuijk et al. | | D14/452 |
| 7,207,535 B1 | 4/2007 | Giuliani | | 248/216.1 |
| 7,243,888 B2 | 7/2007 | Van Peek | | 248/304 |
| 2007/0190891 A1 | 8/2007 | McKinnon | | 446/72 |

OTHER PUBLICATIONS

Research Mannikins Website, Move-It Bracket, Date Unknown.

* cited by examiner

*Primary Examiner* — Anita M King
(74) *Attorney, Agent, or Firm* — Michael R. Schramm

(57) ABSTRACT

The repositionable taxidermy mount apparatus is an invention that allows a user to quickly and easily reposition a taxidermy type mounted animal or animal portion. The apparatus provides for motion about a plurality of axes creating the ability to display a taxidermy mounted animal in a multitude of different positions and orientations. The apparatus further includes an easily interchangeable swivel plate device which allows the user to display different mounted animals at various mount angles.

2 Claims, 10 Drawing Sheets

REPOSITIONABLE TAXIDERMY MOUNT APPARATUS

BACKGROUND OF THE INVENTION

Field of the Invention

This invention relates to taxidermy type mounting apparatuses and in particular, to taxidermy mounting apparatuses that provide for movement or repositioning of the mounted game or fish or like mounted object Description of the Related Art It is common for hunters, fishermen, and outdoor enthusiasts to desire to display animals or the like that they have taken in the wild. A variety of taxidermy type mounting apparatuses are further well known and are in widespread use in displaying such animals. Such mounting apparatuses have often consisted merely of a static display case, a static display stand, or of a static plaque type mounting apparatus that mounts substantially flush to a wall.

However, some have sought to improve upon such static type mounting apparatuses. Many users of mount apparatuses have shown a desire to be able to reposition a mounted animal head or animal bust to a variety of different positions without the need of having to remount the animal head or animal bust. For instance, the following list of US patents and applications disclose inventions related to taxidermy mounting apparatuses and/or movable mounting apparatuses and are incorporated herein by reference: U.S. Pat. Nos. 4,145,006, 4,225,106, 4,971,865, 6,458,434, 6,561,468, 6,828,035, 7,207,535, 7,243,888, and 20070190891. However, the inventive concepts disclosed in the preceding list of patents have failed to teach a repositionable taxidermy mount apparatus that may be repositionable about multiple axes or that may be repositioned beyond movement about a single rotational axis. Such a repositionable taxidermy mount apparatus that overcomes the noted problems is heretofore unknown and is the subject of this invention.

SUMMARY OF THE INVENTION

The present invention has been developed in response to the present state of the art, and in particular, in response to taxidermy mount apparatuses that were described to be lacking in the art. Accordingly, the present invention is an improved taxidermy mount system or apparatus that comprises substantially flat base plate having at least one support collar, a cantilever type swing arm, and a swivel plate device. The base plate is fastened to a wall or like structure. A first end of the swing arm is rotatingly positioned in the collar, and the swivel plate device is rotatingly positioned on the second end of the swing arm. With the apparatus thus assembled, the swing arm is free to rotate about a first axis of the swing arm that is substantially coincident with the center of the collar and the center of the swing arm first end. The swivel plate device is also free to rotate about an axis that is substantially coincident to the center of the swing arm second end and the center of the swivel plate device. An animal head or animal bust or like object is preferably mounted to the swivel plate device. Thus the taxidermy mount apparatus is adapted to reposition such mounted animal head in a great many different positions and attitudes without mechanical alteration to the mount apparatus.

Reference throughout this specification to features, advantages, or similar language does not imply that all of the features and advantages that may necessarily be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
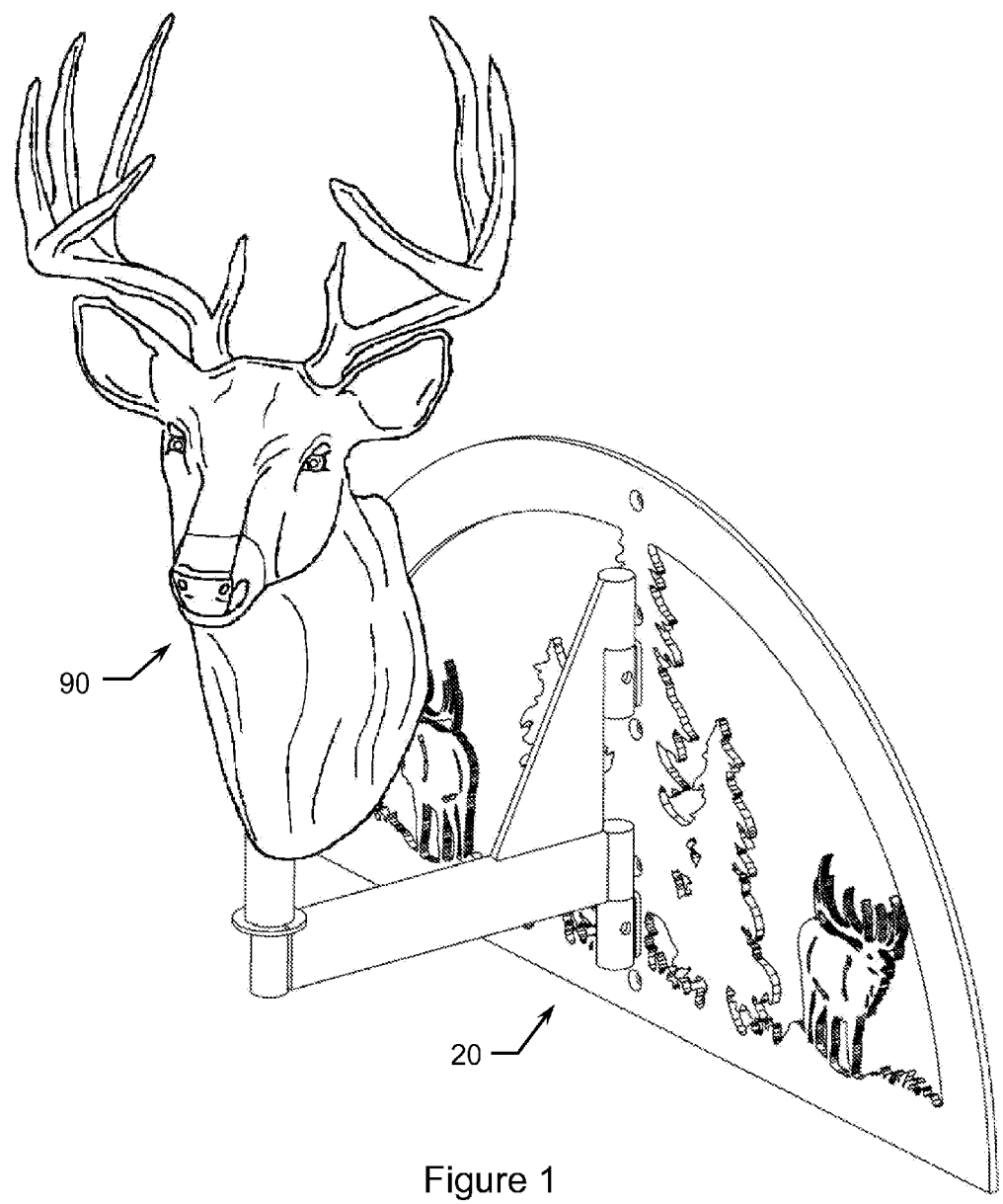
FIG. 1 is an isometric view of a first embodiment of the apparatus having an animal bust shown mounted to the apparatus.
Figure 2:
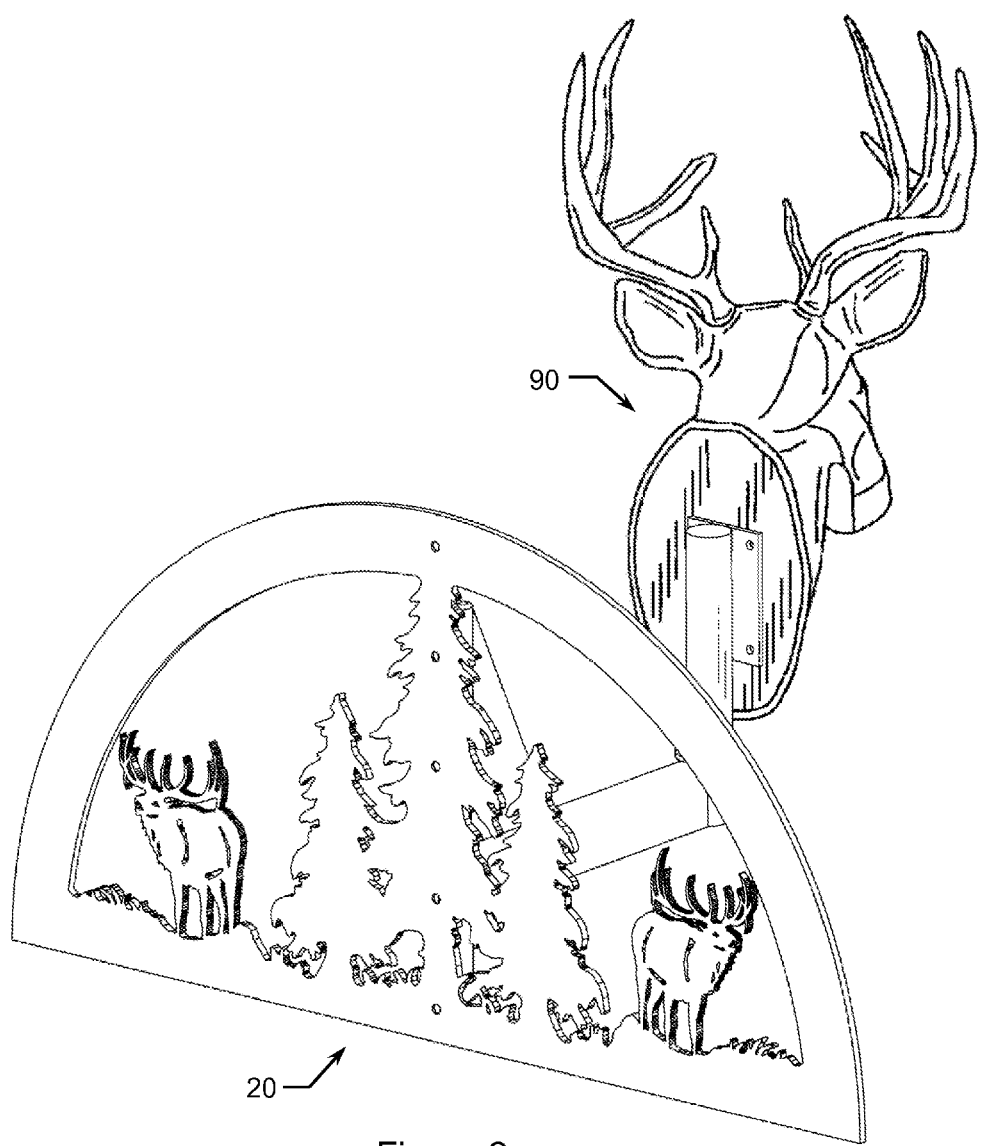
FIG. 2 is a reverse isometric view of a first embodiment of the apparatus having an animal bust shown mounted to the apparatus.
Figure 3:
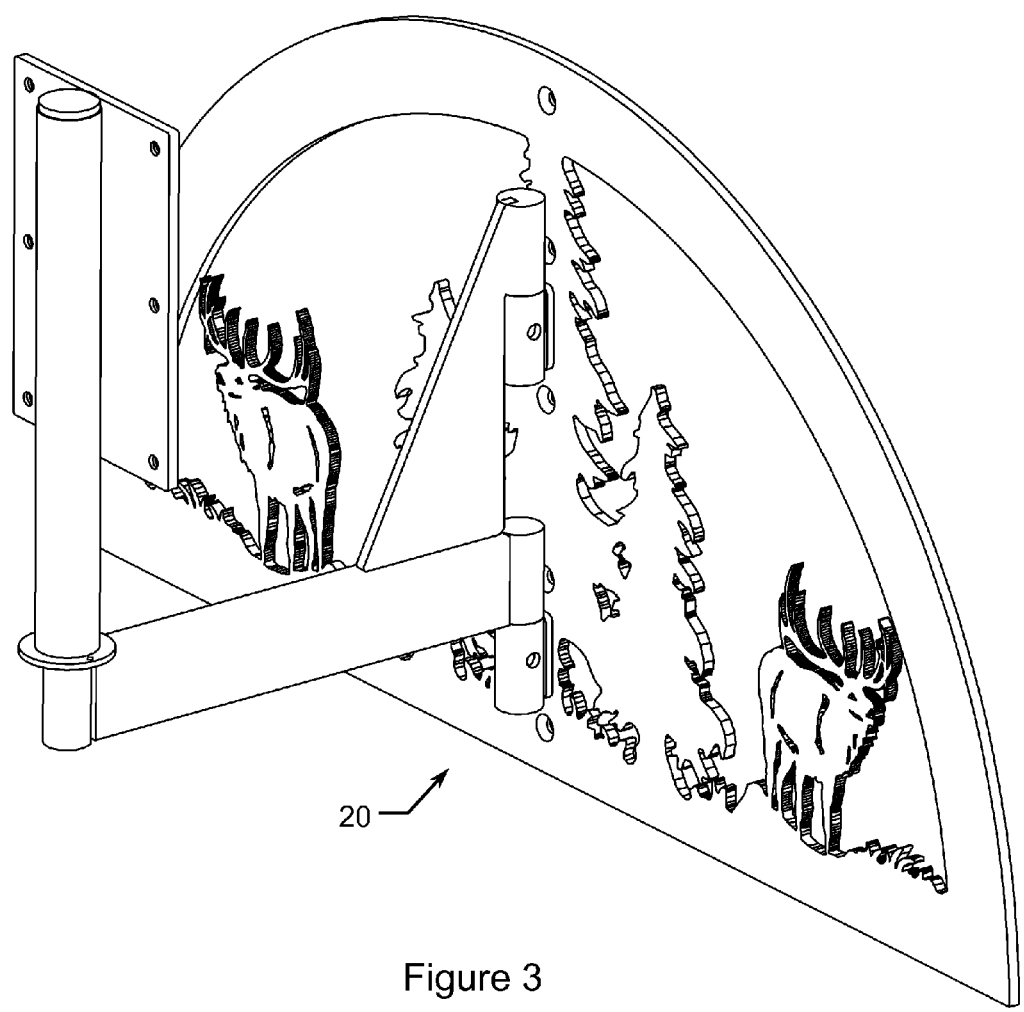
FIG. 3 is an isometric view of a first embodiment of the apparatus.
Figure 4:
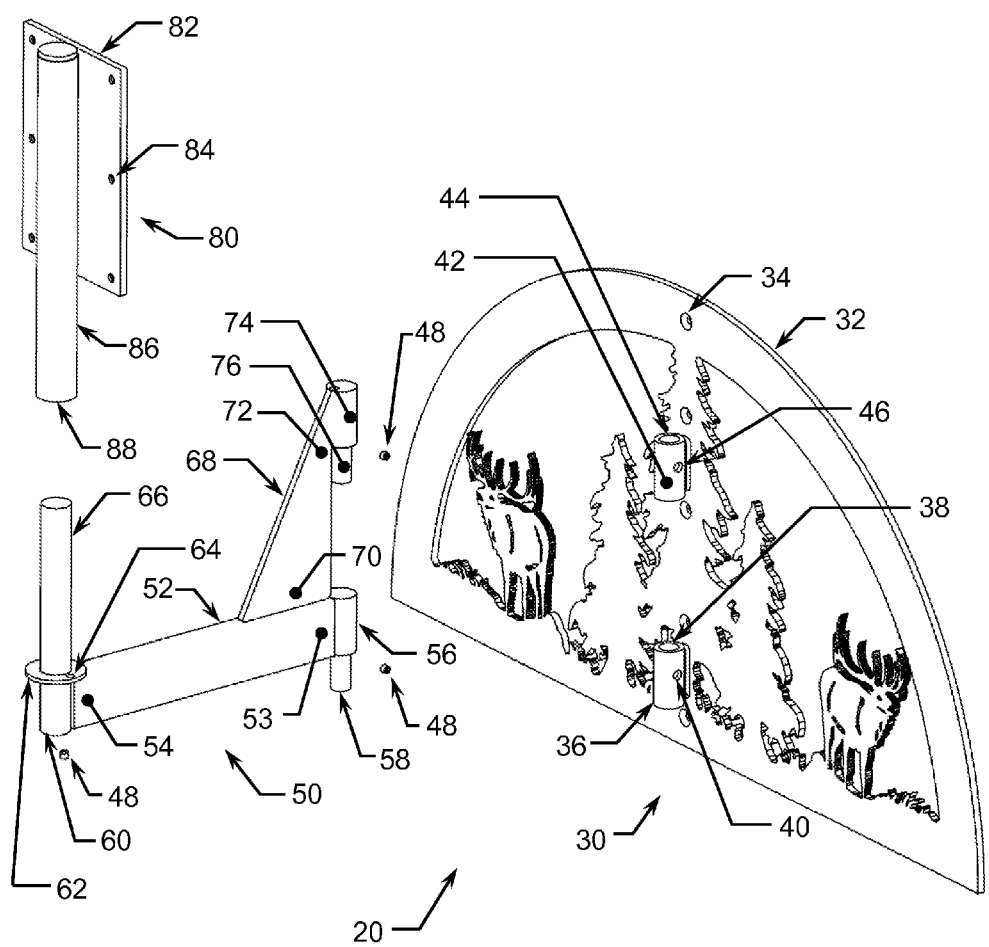
FIG. 4 is an exploded isometric view of a first embodiment of the apparatus.
Figure 5:
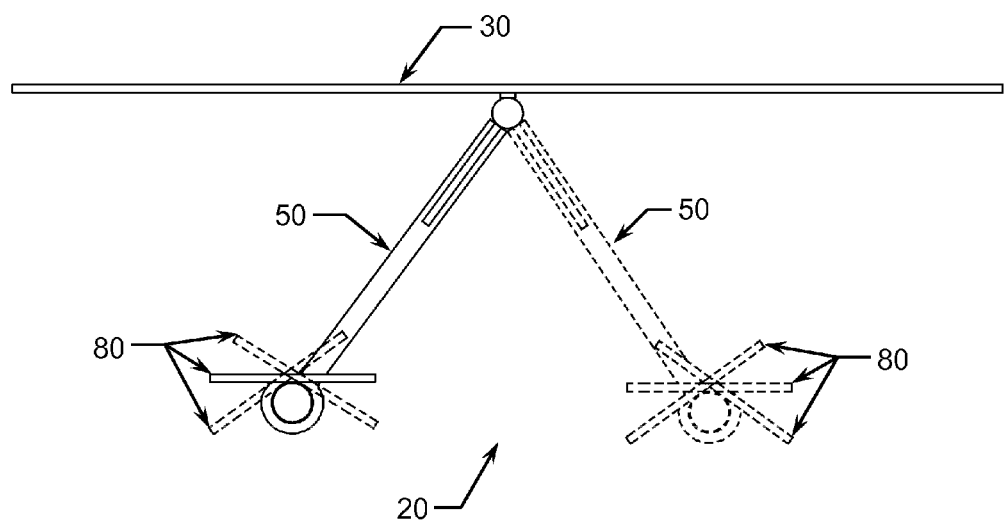
FIG. 5 is a plan view of a first embodiment of the apparatus depicting the rotational movement of the apparatus.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The invention is an improved repositionable taxidermy mount apparatus for display a mounted animal bust in a variety of repositionable positions. The invention preferably includes at least one swing arm that provides for rotational movement about at least two axes. In order to facilitate the understanding of the present invention in reviewing the drawings accompanying the specification, a feature list is provided below. It is noted that like features are like numbered throughout all of the figures.

FEATURE TABLE

| # | Feature | # | Feature |
|---|---|---|---|
| 20 | Mount apparatus | 30 | Base |
| 32 | Base plate | 34 | Attach hole |
| 36 | Lower blind collar | 38 | Bore hole |
| 40 | Threaded set screw hole | 42 | Upper blind collar |
| 44 | Bore hole | 46 | Threaded set screw hole |
| 48 | Set screw | 50 | Swing arm device |
| 52 | Support arm | 53 | Support arm first end |
| 54 | Support arm second end | 56 | First shaft |
| 58 | Rod | 60 | Second shaft |
| 62 | Shaft flange | 64 | Set screw hole |
| 66 | Rod | 68 | Gusset |
| 70 | Gusset lower end | 72 | Gusset upper end |
| 74 | Third shaft | 76 | Rod |
| 80 | Swivel plate device | 82 | Swivel plate |
| 84 | Attach hole | 86 | Blind collar |
| 88 | Bore hole | 90 | Animal bust |
| 92 | Pedestal | 94 | Base |
| 96 | Rod | | |
| 120 | Mount apparatus | 30 | Base |
| 32 | Base plate | 34 | Attach hole |
| 36 | Lower blind collar | 38 | Bore hole |
| 40 | Threaded set screw hole | 42 | Upper blind collar |
| 44 | Bore hole | 46 | Threaded set screw hole |
| 48 | Set screw | 150 | Swing arm device |
| 52 | Support arm | 53 | Support arm first end |
| 54 | Support arm second end | 56 | First shaft |
| 58 | Rod | 60 | Second shaft |
| 62 | Shaft flange | 64 | Set screw hole |
| 66 | Rod | 68 | Gusset |
| 70 | Gusset lower end | 72 | Gusset upper end |
| 74 | Third shaft | 76 | Rod |
| 80 | Swivel plate device | 82 | Swivel plate |
| 84 | Attach hole | 86 | Blind collar |
| 88 | Bore hole | 90 | Animal bust |
| 220 | Mount apparatus | 230 | Base |
| 32 | Base plate | 34 | Attach hole |
| 36 | Lower blind collar | 38 | Bore hole |
| 40 | Threaded set screw hole | | |
| 48 | Set screw | 250 | Swing arm device |
| 52 | Support arm | 53 | Support arm first end |
| 54 | Support arm second end | 56 | First shaft |
| 58 | Rod | 60 | Second shaft |
| 62 | Shaft flange | 64 | Set screw hole |
| 66 | Rod | | |
| 80 | Swivel plate device | 82 | Swivel plate |
| 84 | Attach hole | 86 | Blind collar |
| 88 | Bore hole | 90 | Animal bust |
| 320 | Mount apparatus | 30 | Base |
| 32 | Base plate | 34 | Attach hole |
| 36 | Lower blind collar | 38 | Bore hole |
| 40 | Threaded set screw hole | 42 | Upper blind collar |
| 44 | Bore hole | 46 | Threaded set screw hole |
| 48 | Set screw | 250 | Swing arm device |
| 52 | Support arm | 53 | Support arm first end |
| 54 | Support arm second end | 56 | First shaft |
| 58 | Rod | 60 | Second shaft |
| 62 | Shaft flange | 64 | Set screw hole |
| 66 | Rod | | |
| 80 | Swivel plate device | 82 | Swivel plate |
| 84 | Attach hole | 86 | Blind collar |
| 88 | Bore hole | 90 | Animal bust |
| 420 | Mount apparatus | 30 | Base |
| 32 | Base plate | 34 | Attach hole |
| 36 | Lower blind collar | 38 | Bore hole |
| 40 | Threaded set screw hole | 42 | Upper blind collar |
| 44 | Bore hole | 46 | Threaded set screw hole |
| 48 | Set screw | 50 | Swing arm device |
| 52 | Support arm | 53 | Support arm first end |
| 54 | Support arm second end | 56 | First shaft |
| 58 | Rod | 60 | Second shaft |
| 62 | Shaft flange | 64 | Set screw hole |
| 66 | Rod | 68 | Gusset |
| 70 | Gusset lower end | 72 | Gusset upper end |
| 74 | Third shaft | 76 | Rod |
| 480 | Swivel plate device | 82 | Swivel plate |
| 84 | Attach hole | 86 | Blind collar |
| 88 | Bore hole | 90 | Animal bust |

Referring now to the drawings and in particular to FIGS. 1 through 4, a first embodiment of the invention is a repositionable taxidermy mount apparatus 20 for use in displaying a mounted animal bust 90 in a variety of repositionable configurations comprising a base 30, a swing arm device 50, a swivel plate device 80, and preferably a plurality of set screws 48. It shall be noted that a variety of creatures or creature parts including but not limited to a deer head, a deer bust, an elk head, an elk bust, an antelope head, an antelope bust, a moose head, a moose bust, a bear head, a bear bust, a bison head, a bison bust, a bird, a bird head, a bird bust, a fish, and a fish head may be mounted to apparatus 20, and that all such creatures or creature parts shall fall within the meaning of the term "taxidermy mount object".

Base 30 comprises a substantially flat rigid steel base plate 32 welded to a lower blind steel collar 36 and to an upper blind steel collar 42. Plate 32 further includes a plurality of attach holes 34. Plate 32 may optionally include decorative cutouts formed in plate 32. For instance, plate 32 may define an outdoor type scenery cutout depicting trees, animals, and other images relating to hunting. Lower blind collar 36 includes a bore hole 38, and preferably a threaded set screw hole 40. Upper blind collar 42 includes a bore hole 44, and preferably a threaded set screw hole 46.

Swing arm device 50 comprises a support arm 52, a first shaft 56, a second shaft 60, a gusset 68, and a third shaft 74. Support arm 52 defines generally rectangular elongated rigid steel arm having a first end 53, and a second end 54. First shaft 56 defines a generally rigid cylindrical steel shaft having a rigid cylindrical steel rod 58 protruding downwardly from shaft 56. Shaft 56 defines an outer diameter and rod 58 defines an outer diameter, with the outer diameter of shaft 56 being larger than the outer diameter of rod 58. Second shaft 60 defines a generally rigid cylindrical steel shaft having a rigid cylindrical steel rod 66 protruding upwardly from shaft 60 and having a substantially thin cylindrical steel flange 62 affixed between shaft 60 and rod 66 and extending radially outward therefrom. Shaft 60 defines an outer diameter, rod 66 defines an outer diameter, and flange 62 defines an outer diameter, with the outer diameter of shaft 60 being larger than the outer diameter of rod 66, and with the outer diameter of flange 62 being larger than the outer diameter of shaft 60. Flange 62 further preferably includes threaded set screw hole 64 formed in flange 62. Gusset 68 defines generally flat triangular rigid steel gusset having a lower end 70, and an upper end 72. Third shaft 74 defines a generally rigid cylindrical steel shaft having a rigid cylindrical steel rod 76 protruding downwardly from shaft 74. Shaft 74 defines an outer diameter and rod 76 defines an outer diameter, with the outer diameter of shaft 74 being larger than the outer diameter of rod 76. Support arm first end 53 is welded to first shaft 56, and support arm second end 54 is welded to second shaft 60. Gusset lower end is welded to an upper surface of support arm 52, and gusset upper end is welded to shaft 74. Swing arm device 50, having a gusset 68 and a third shaft 74, is considered a heavy duty swing arm device.

Swivel plate device 80 comprises a substantially flat rigid steel swivel plate 82 welded to an elongated blind steel collar 86 such that plate 82 is positioned substantially parallel to collar 86. Plate 82 further includes a plurality of attach holes 84. Elongated blind collar 86 includes an elongated bore hole 88.

Set screw 48 defines a mechanical type set screw as is common to the fastening industry. Specifically, set screw 48 preferably defines a cylindrical screw having outer threads and a point on a first end and a slot on a second end. Pedestal 92 defines a conventional pedestal having a base 94 and a rod 96.

Repositionable taxidermy mount apparatus 20 is assembled such that base 30 is mounted to a wall or like structure by installing screws or like fasteners through attach holes 34 and into a wall, swing arm device 50 is rotatingly connected to base 30 by inserting rods 58 and 76 into bore holes 38 and 44 respectively, and swivel plate device 80 is rotatingly connected to swing arm device 50 by inserting rod 66 into bore hole 88. With apparatus 20 thus assembled, swivel plate 82 is repositionable to a multitude of different positions by virtue of swing arm device 50 being rotatable with respect to base 30 in combination with swivel plate device 80 being rotatable with respect to swing arm device 50. Such compound movement or movement along or about more than one axis for the purposes of this application shall be considered "complex movement" and shall define over "simple movement" which for the purposes of this application shall be considered that movement which is limited to movement along or about a single axis. To temporarily secure swivel plate 82 from movement, set screws 48 may be threadingly inserted into threaded set screw holes 40 and 46 such that rotation of swing arm device 50 with respect to base 30 is temporarily prevented and set screws 48 may be threadingly inserted into threaded set screw hole 64 such that such that rotation of swivel plate device 80 with respect to swing arm device 50 is temporarily prevented.

In practice, before apparatus 20 is assembled, swivel plate device 80 is preferably assembled into animal bust 90 by casting device 80 within a foam or like animal bust substrate material during the taxidermy construction process of animal bust 90. In such construction process, the only portion of swivel plate device 80 that remains exposed is bore hole 88. Alternatively, swivel plate device 80 may be retroactively attached to a pre-existing animal bust 90 by inserting screws or like fasteners through attach holes 84 and animal bust 90. When apparatus 20 is assembled as described and includes animal bust 90 attached to plate 82, animal bust 90 is repositionable to a multitude of different positions. Thus for instance animal bust 90 could be positioned near a wall or far from a wall. Further, animal bust 90 could be positioned such that animal bust 90 appears to be looking towards a viewer at a predetermined viewing location or alternatively animal bust 90 could be positioned such that animal bust 90 appears to be looking away from a viewer at a predetermined viewing location.

It is noted that swivel plate device 80 is simply and easily removed from swing arm device 50 and may readily placed on a pedestal such as pedestal 92 by placing bore hole 88 over rod 96. Furthermore, swivel plate device 80 having animal bust attached thereto, may be simply and easily replaced with a second instance of swivel plate device 80 having a second instance of animal bust 90 attached thereto. Thus using the described method, if a user tires of displaying for instance a deer bust, the user may easily replace the deer bust with an antelope bust.

Figure 6:
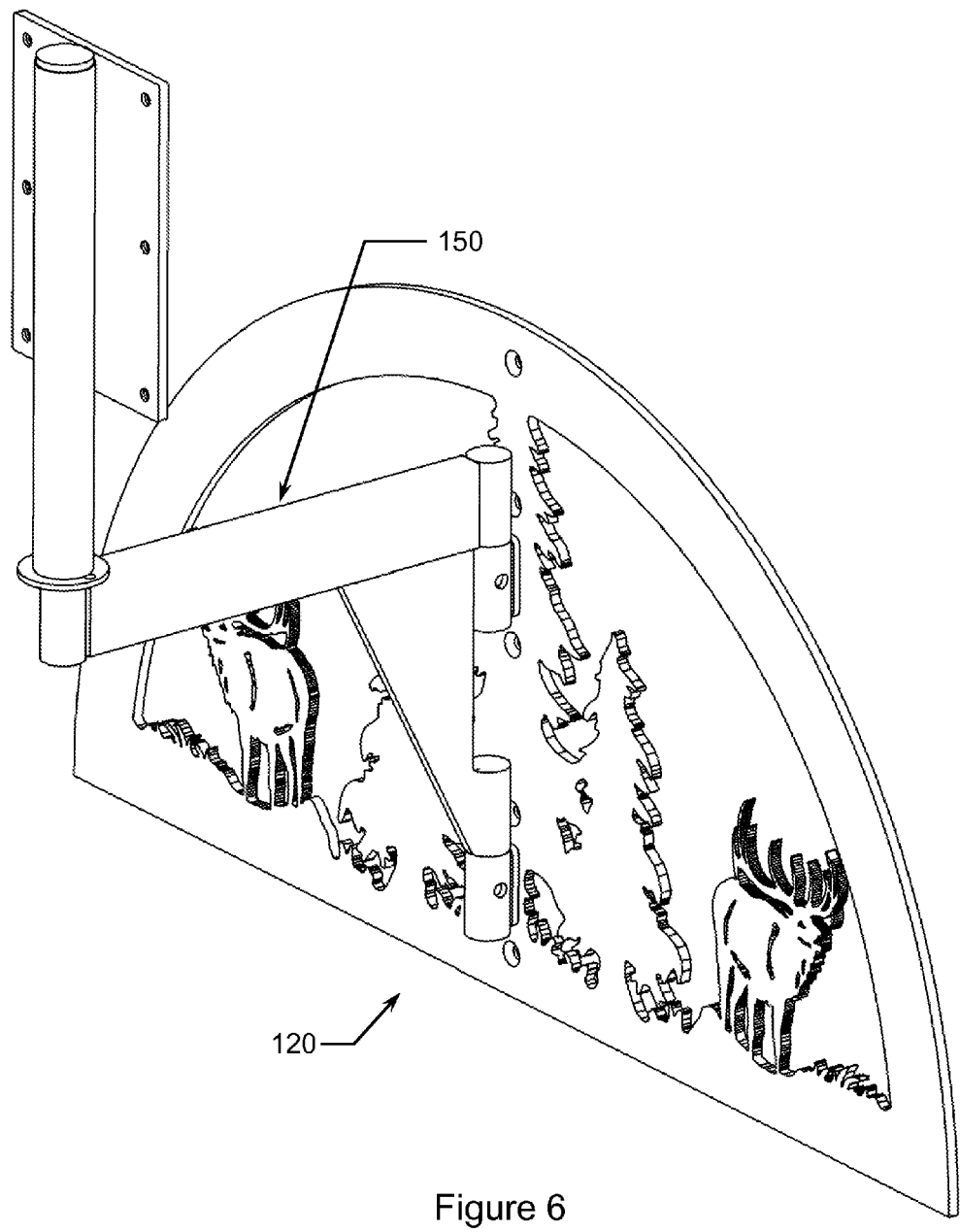
FIG. 6 is an isometric view of a second embodiment of the apparatus, the second embodiment having an inverted swing arm.

Referring now to the drawings and in particular to FIG. 6, a second embodiment of the invention is repositionable taxidermy mount apparatus 120. Apparatus 120 is substantially identical to apparatus 20 and includes all of the parts and features of apparatus 20 except that in apparatus 120, swing arm device 50 is replaced with swing arm device 150. Swing arm device 150 is substantially identical to swing arm device 50 except that in swing arm device 150, gusset 68 and correspondingly third shaft 74 are welded to a lower surface of support arm 52. Accordingly, in apparatus 120, swivel plate device 80 is positioned higher with respect to base 30 than is swivel plate device 80 with respect to base 30 in apparatus 20.

Figure 7:
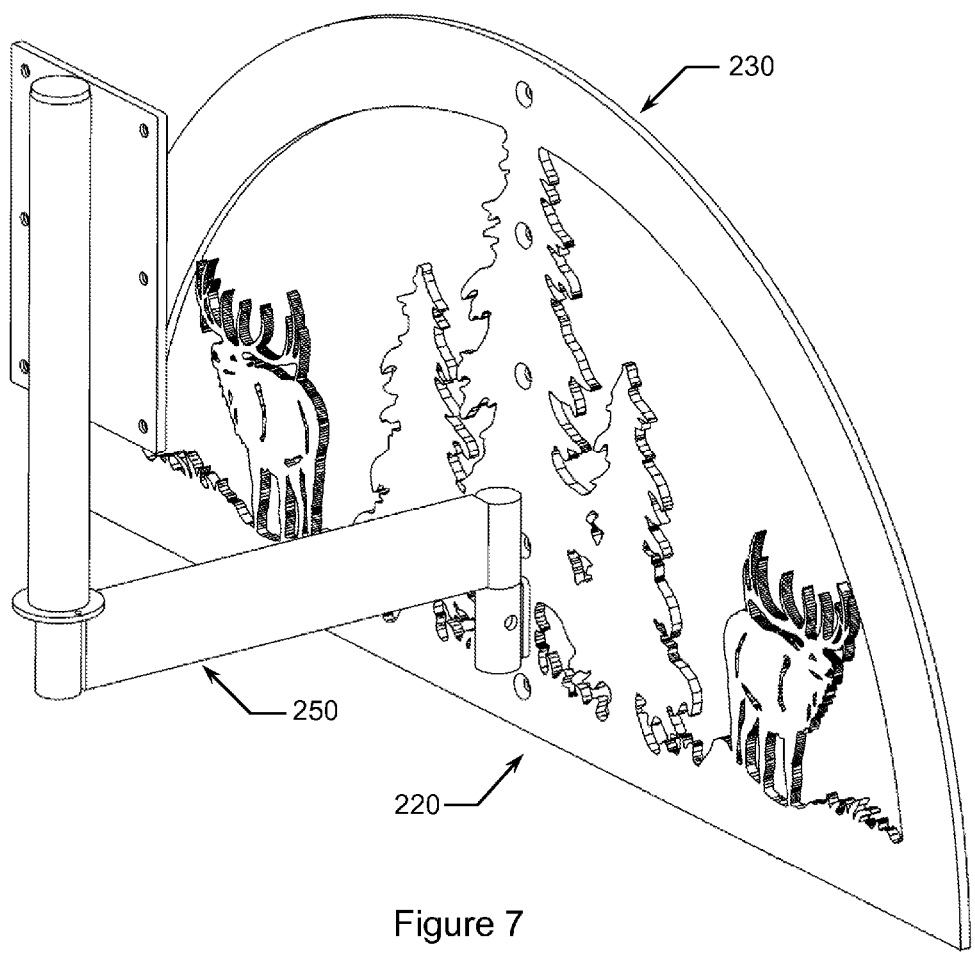
FIG. 7 is an isometric view of a third embodiment of the apparatus, the third embodiment having a light duty swing arm.

Referring now to the drawings and in particular to FIG. 7, a third embodiment of the invention is repositionable taxidermy mount apparatus 220. Apparatus 220 is substantially identical to apparatus 20 and includes all of the parts and features of apparatus 20 except that in apparatus 220, base 30 is replaced with base 230 and swing arm device 50 is replaced with swing arm device 250. Base 230 is substantially identical to base 30 except that base 230 does not include upper blind collar 42. Swing arm device 250 is substantially identical to swing arm device 50 except that swing arm device 250 does not include gusset 68 or third shaft 74. Swing arm device 250, not having a gusset 68 and a third shaft 74, is considered a light duty swing arm device.

Figure 8:
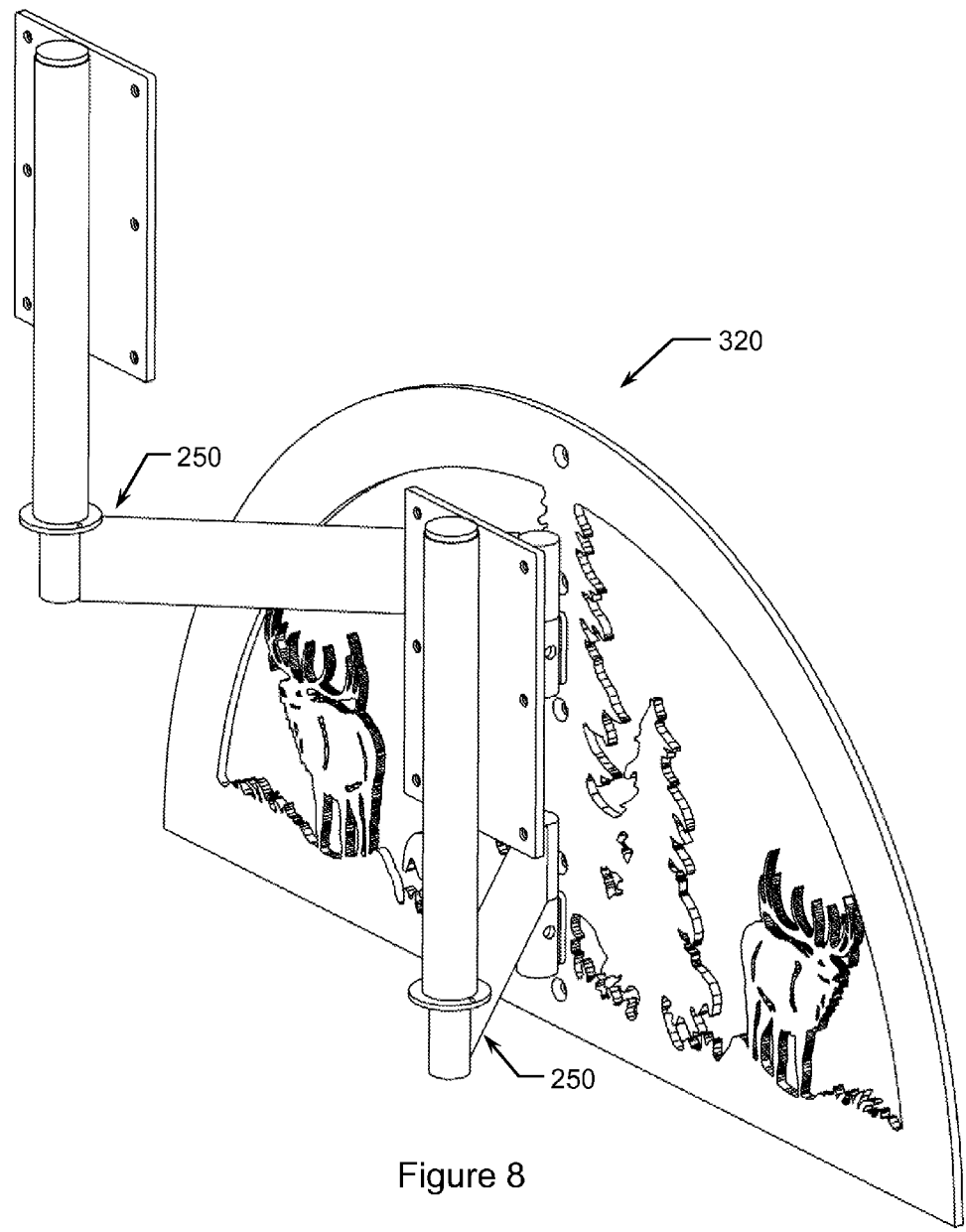
FIG. 8 is an isometric view of a fourth embodiment of the apparatus, the fourth embodiment having multiple swing arms.

Referring now to the drawings and in particular to FIG. 8, a fourth embodiment of the invention is repositionable taxidermy mount apparatus 320. Apparatus 320 is substantially identical to apparatus 20 and includes all of the parts and features of apparatus 20 except that in apparatus 320, single swing arm device 50 is replaced with two instances of swing arm device 250. Accordingly, in apparatus 320, two instances of animal bust 90 may be displayed and repositioned simultaneously.

Figure 9:
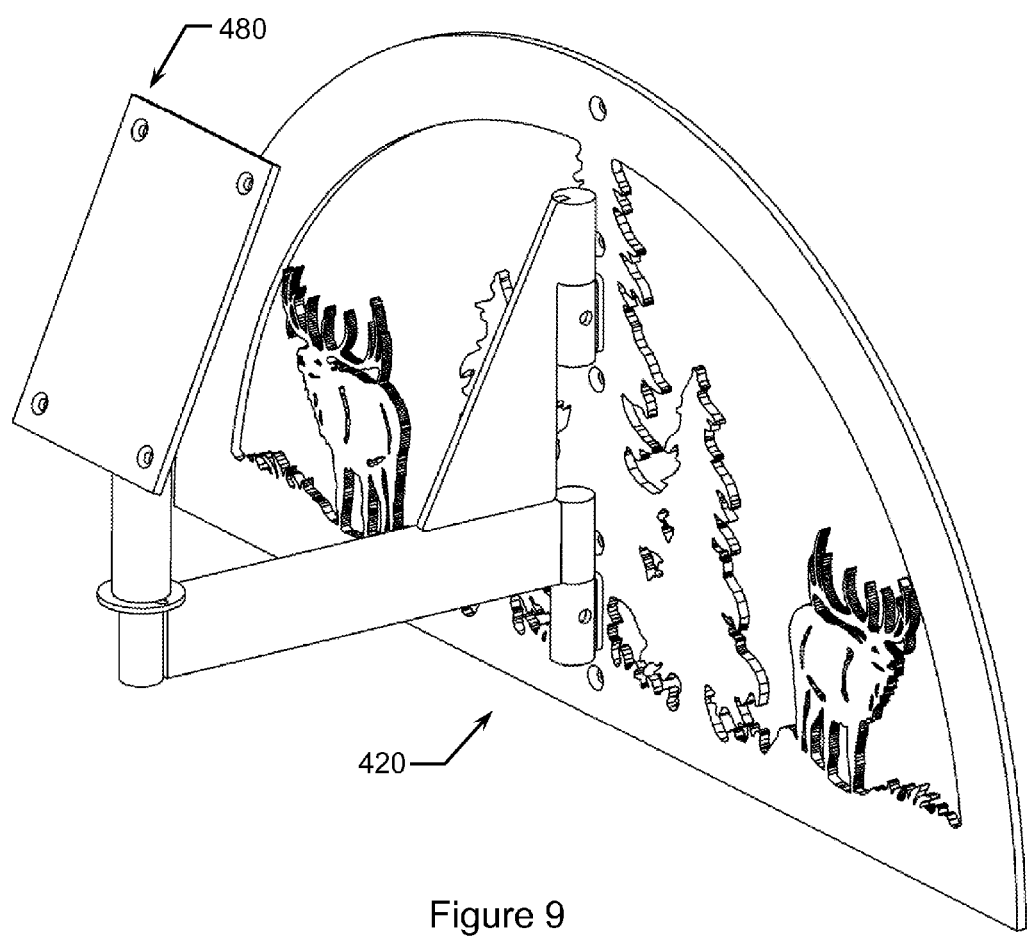
FIG. 9 is an isometric view of a fifth embodiment of the apparatus, the fifth embodiment having an angled swivel plate device.
Figure 10:
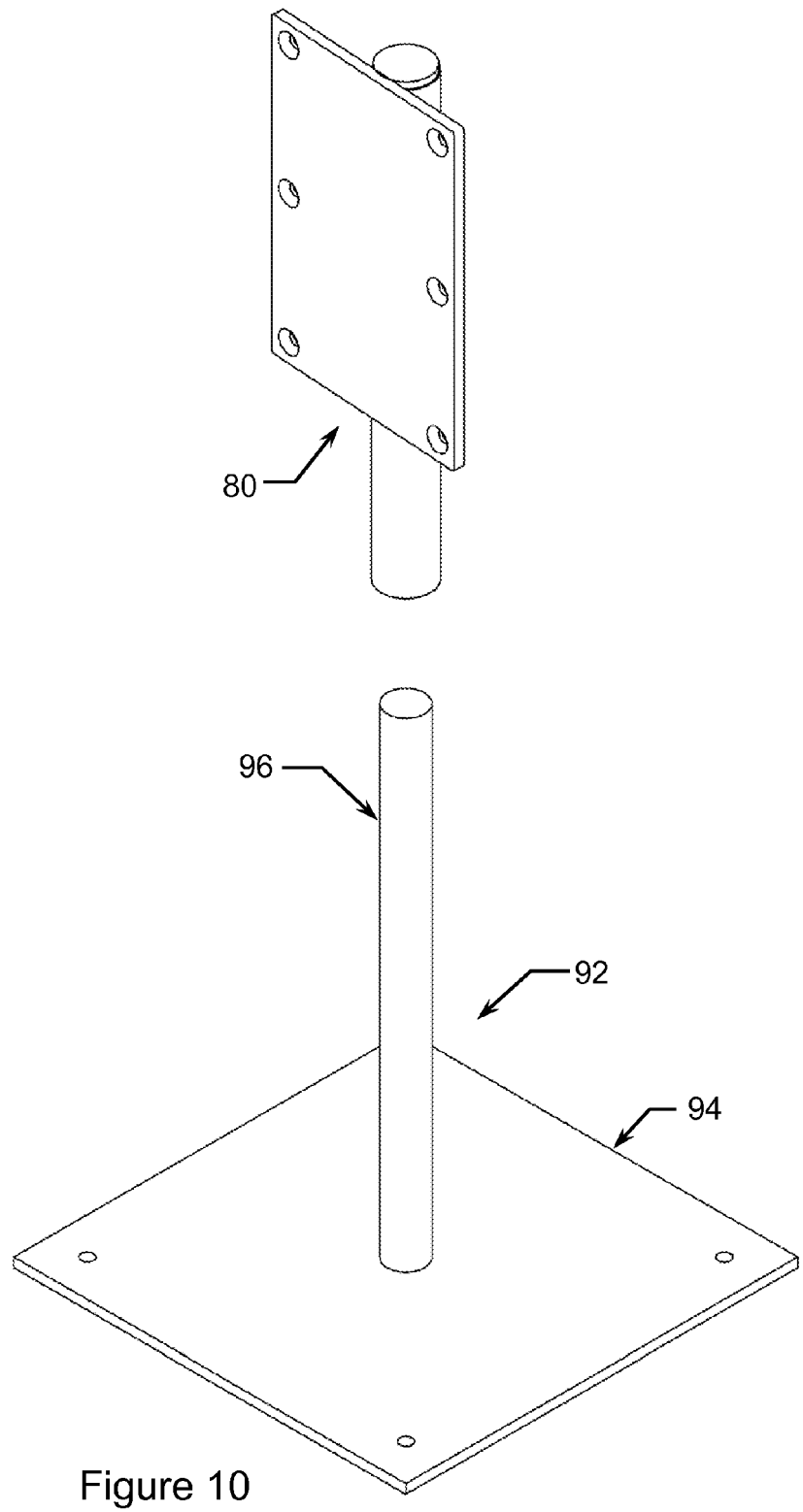
FIG. 10 is an exploded isometric view of a swivel plate device and a pedestal.

Referring now to the drawings and in particular to FIG. 9, a fifth embodiment of the invention is repositionable taxidermy mount apparatus 420. Apparatus 420 is substantially identical to apparatus 20 and includes all of the parts and features of apparatus 20 except that in apparatus 420, swivel plate device 80 is replaced with swivel plate device 480. Swivel plate device 480 is substantially identical to swivel plate device 80 except that in swivel plate device 480, swivel plate 82 is welded to collar 86 such that plate 82 is positioned in a substantially angled or non-parallel attitude with respect to collar 86. Accordingly, in apparatus 420, animal bust 90 may be display at an angle that is different from the display angle of apparatus 20. Furthermore, it is noted that in apparatus 20, a variety of swivel plate devices having a variety of swivel plate display angles may be substituted for swivel plate device 80.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A repositionable taxidermy mount apparatus for use in repositionally displaying a taxidermy mount object including processed deer, elk, antelope, moose, bear, bison, birds, and fish both near a wall and far from a wall via complex movement such that the viewing orientation of said taxidermy mount object is altered, said apparatus comprising:
    a base defining a substantially flat plate having at least one collar connected to said plate;
    a support arm having a first end and a second end, said first end being connected to at least one first shaft having a rod extending therefrom, and said second end being connected to a second shaft having a rod extending therefrom;
    a swivel device defining a substantially flat plate having a collar connected to said plate, and;
    a taxidermy mount object;
    wherein said rod of said at least one first shaft is rotatably positioned in said at least one base collar, and wherein said swivel device collar is rotatably positioned on said rod of said second shaft, and wherein said taxidermy mount object is mounted to said swivel device such that said support arm is rotatable about said support arm first end and said swivel device is rotatable about said support arm second end, such that said taxidermy mount object is repositionable via complex motion to result in at least one repositioning comprising said taxidermy mount object being repositioned from a near to said base position to a far from said base position, said taxidermy mount object being repositioned from a far from said base position to a near to said base position, said taxidermy mount object being repositioned from a looking towards a viewer at a predetermined viewing location position to a looking away from said viewer at said predetermined viewing location position, said taxidermy mount object being repositioned from a looking away from a viewer at a predetermined viewing location position to a looking towards said viewer at said predetermined viewing location position, and a combination thereof, and wherein a select apparatus position is temporarily fixed, and wherein said base collar includes a threaded set screw hole, and wherein said support arm second shaft includes a flange having a threaded set screw hole, and wherein said apparatus includes a plurality of threaded set screws, and wherein when a set screw is threadingly inserted into said base collar set screw hole and wherein when a set screw is threadingly inserted into said support arm flange set screw hole, said select apparatus position is temporarily fixed.

2. A repositionable taxidermy mount apparatus for use in repositionally displaying a taxidermy mount object including processed deer, elk, antelope, moose, bear, bison, birds, and fish both near a wall and far from a wall via complex movement such that the viewing orientation of said taxidermy mount object is altered, said apparatus comprising:
    a base defining a substantially flat plate having at least one collar connected to said plate;
    a support arm having a first end and a second end, said first end being connected to at least one first shaft having a rod extending therefrom, and said second end being connected to a second shaft having a rod extending therefrom;
    a swivel device defining a substantially flat plate having a collar connected to said plate, and;
    a taxidermy mount object;
    wherein said rod of said at least one first shaft is rotatably positioned in said at least one base collar, and wherein said swivel device collar is rotatably positioned on said rod of said second shaft, and wherein said taxidermy mount object is mounted to said swivel device such that said support arm is rotatable about said support arm first end and said swivel device is rotatable about said support arm second end, such that said taxidermy mount object is repositionable via complex motion to result in at least one repositioning comprising said taxidermy mount object being repositioned from a near to said base position to a far from said base position, said taxidermy mount object being repositioned from a far from said base position to a near to said base position, said taxidermy mount object being repositioned from a looking towards a viewer at a predetermined viewing location position to a looking away from said viewer at said predetermined viewing location position, said taxidermy mount object being repositioned from a looking away from a viewer at a predetermined viewing location position to a looking towards said viewer at said predetermined viewing location position, and a combination thereof, and wherein said base includes a plurality of collars, and wherein said support arm includes a plurality of first shafts, and wherein said support arm includes a gusset having a first end and a second end, said gusset first end being connected to said support arm and said second gusset end being connected to a second instance of a first shaft.

* * * * *